(12) United States Patent
Hunt et al.

(10) Patent No.: US 8,532,004 B2
(45) Date of Patent: Sep. 10, 2013

(54) POWER MANAGEMENT ON PORTABLE DEVICES

(75) Inventors: James Anthony Hunt, Chapel Hill, NC (US); Joshua Neil Novak, Wake Forest, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 359 days.

(21) Appl. No.: 12/987,846

(22) Filed: Jan. 10, 2011

(65) Prior Publication Data

US 2012/0176946 A1 Jul. 12, 2012

(51) Int. Cl.
*G08C 17/00* (2006.01)

(52) U.S. Cl.
USPC ........ 370/311; 370/331; 370/332; 455/343.5; 455/446

(58) Field of Classification Search
USPC .............. 370/311, 332, 334; 340/7.32, 7.38; 455/343.1, 343.2, 343.4, 343.5, 343.6
See application file for complete search history.

(56) References Cited

U.S. PATENT DOCUMENTS

| | | | |
|---|---|---|---|
| 7,656,839 B2 * | 2/2010 | Backes et al. | 370/331 |
| 7,769,397 B2 * | 8/2010 | Funato et al. | 455/458 |
| 2005/0165909 A1 * | 7/2005 | Cromer et al. | 709/219 |
| 2006/0063560 A1 * | 3/2006 | Herle | 455/552.1 |
| 2007/0076683 A1 * | 4/2007 | Chung et al. | 370/350 |
| 2007/0283445 A1 * | 12/2007 | Kaneko | 726/26 |
| 2009/0111485 A1 * | 4/2009 | Kitani | 455/456.1 |
| 2009/0207766 A1 * | 8/2009 | Hwang et al. | 370/310 |
| 2009/0279464 A1 * | 11/2009 | Kakani et al. | 370/311 |
| 2009/0280819 A1 * | 11/2009 | Brisebois et al. | 455/446 |
| 2009/0323595 A1 * | 12/2009 | Vacon et al. | 370/328 |
| 2009/0323652 A1 * | 12/2009 | Chen et al. | 370/338 |
| 2010/0008230 A1 * | 1/2010 | Khandekar et al. | 370/237 |
| 2010/0011231 A1 * | 1/2010 | Banerjea et al. | 713/320 |
| 2010/0246460 A1 * | 9/2010 | Kholaif et al. | 370/311 |
| 2011/0032857 A1 * | 2/2011 | Umeuchi et al. | 370/311 |
| 2011/0034144 A1 * | 2/2011 | Yang et al. | 455/343.2 |
| 2011/0058500 A1 * | 3/2011 | Nagasaki | 370/254 |
| 2011/0294504 A1 * | 12/2011 | Hara et al. | 455/434 |
| 2011/0306294 A1 * | 12/2011 | Yamazaki et al. | 455/41.1 |
| 2012/0106527 A1 * | 5/2012 | Ichikawa et al. | 370/338 |
| 2012/0120858 A1 * | 5/2012 | Das et al. | 370/311 |
| 2012/0163312 A1 * | 6/2012 | Xhafa et al. | 370/329 |
| 2012/0214536 A1 * | 8/2012 | Kim et al. | 455/522 |

\* cited by examiner

*Primary Examiner* — Ian N Moore
*Assistant Examiner* — Phong La
(74) *Attorney, Agent, or Firm* — John L. Rogitz; John M. Rogitz (57) ABSTRACT

A computing apparatus receives data that corresponds to a wireless network connection established with an access point. The computing apparatus determines whether the access point corresponds to a predetermined access point type, and also determines that a device is to transition to a reduced power state. When the access point corresponds to the predetermined access point type and the determines that the device is to transition to the reduced power state, the computing apparatus transitions the device from a first power state to a reduced power state, and maintains the wireless network connection by using at least a subset of wireless functionality operatively coupled to the device.

17 Claims, 8 Drawing Sheets

| Access Point Type | Active State | | Inactive State | |
|---|---|---|---|---|
| | Processor | Wireless Functionality | Processor | Wireless Functionality |
| 210 — Preferred | Higher Power | Higher Power | Reduced Power | Higher Power |
| 220 — Non-Preferred | Higher Power | Higher Power | Reduced Power | Reduced Power (Timed Wakeup) |
| 230 — Blocked | N/A | N/A | Reduced Power | Reduced Power (Timed Wakeup) |

| Access Point Type | Active State | | Inactive State | |
|---|---|---|---|---|
| | Processor | Wireless Functionality | Processor | Wireless Functionality |
| 210 — Preferred | Higher Power | Higher Power | Reduced Power | Higher Power |
| 220 — Non-Preferred | Higher Power | Higher Power | Reduced Power | Reduced Power (Timed Wakeup) |
| 230 — Blocked | N/A | N/A | Reduced Power | Reduced Power (Timed Wakeup) |
| | 240 | 250 | 260 | 270 |

| Preferred Access Point Table | | |
|---|---|---|
| Access Point ID | Location | Type |
| 142.85.624 | 30.2 / -97.6 | Corporate Hotspot |
| 185.67.259 | 35.7 / -78.6 | Home |
| 246.32.852 | 40.3 / -65.4 | Work |
| 280 | 285 | 290 |

| Network Connection Policies ||
|---|---|
| Policy Type | Policy |
| Default | Sleep Mode from 11:30 PM - 6:00AM |
| Corporate Hotspots | Treat as Preferred Access Points |
| Home Access Points | Sleep Mode from 10:00 PM - 8:00AM |
| Travel Access Points | Sleep Mode from 9:00 PM - 9:00AM |

POWER MANAGEMENT ON PORTABLE DEVICES

TECHNICAL FIELD

The present disclosure relates to managing power on a computing apparatus. More particularly, the present disclosure relates to maintaining a presence on a wireless network when the computing apparatus is in a low power state.

BACKGROUND

Portable computing apparatuses, such as computers, notebooks, mobile phones, and netbooks, are designed to connect to wireless networks (WiFi) and establish wireless network connections. These portable computing apparatuses are also designed to conserve power in order to extend battery life. Many portable computing devices change power state depending upon user and/or network activity, such as entering sleep modes (e.g., S2, S3) or a hibernate mode (e.g., S4). In turn, the portable computing apparatuses may disconnect from as the device changes power state.

SUMMARY

A computing apparatus receives data that corresponds to a wireless network connection established with an access point. The computing apparatus determines whether the access point corresponds to a predetermined access point type, and also determines that a device is to transition to a reduced power state. When the access point corresponds to the predetermined access point type and the determines that the device is to transition to the reduced power state, the computing apparatus transitions the device from a first power state to a reduced power state, and maintains the wireless network connection by using at least a subset of wireless functionality operatively coupled to the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
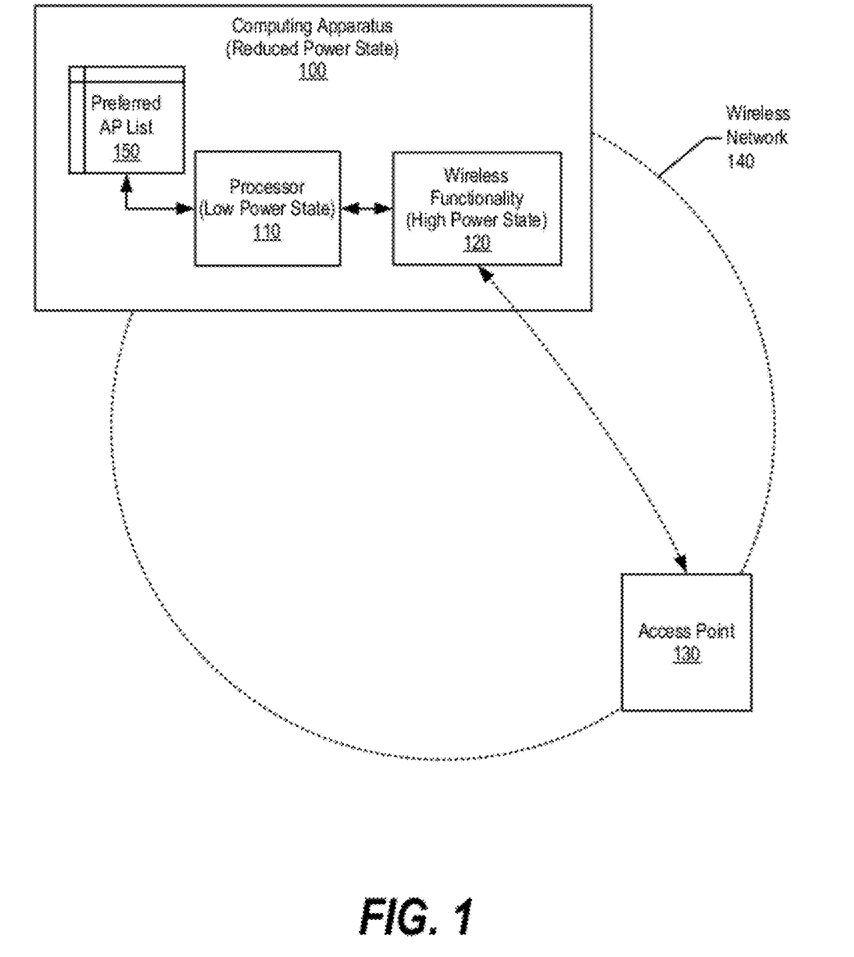
FIG. 1 is a diagram showing a computing apparatus that is configured to monitor network activity when the computer apparatus is in a reduced power state.

FIG. 1 is a diagram showing a computing apparatus that is configured to monitor network activity when the computer apparatus is in a reduced power state. This disclosure allows a computing apparatus to maintain a "presence" on a wireless network (e.g., for instant messaging, VoIP calls, etc) while the computing apparatus is in a low power state to conserve power (e.g., sleep mode or hibernate mode). Although specific examples provided herein refer to a computing apparatus, the concepts described herein apply to any information handling device, including mobile phones, small handheld palmtops, personal data organizers, small and large notebook computers, desktop computers, and etcetera, as covered by the claims.

Computing apparatus 100 includes a device, such as processor 110, and wireless functionality 120. Wireless functionality 120 allows computing apparatus 100 to establish a network connection with access point 130 over wireless network 140. In one embodiment, wireless functionality 120 may be a separate device. In another embodiment, wireless functionality 120 may be wireless circuitry integrated with other electronic circuitry. Processor 110 executes code and performs actions such as baseband encoding/decoding, etc.

When computing apparatus 100 connects to access point 130 over wireless network 140, processor 110 accesses preferred access point list 150 and determines whether access point 130 is a predetermined access point type, such as a "preferred" access point. For example, access point 130 may be a user's home network that the user designated as a preferred access point. As such, when computing apparatus 110 enters a reduced power state (e.g., due to user inactivity or network inactivity), computing device 100 places processor 110 in a reduced power state, and places wireless functionality 120 in a high power state in order to maintain a presence on wireless network 140. In turn, computing apparatus 100 monitors network traffic and "wakes up" processor 110 to process messages that are intended for computing apparatus 100 (see FIG. 4 and corresponding text for further details). Computing apparatus 100, for example, may play a user selected message tone to notify a user when computing apparatus 100 processes an intended message.

In another embodiment, when access point 130 is not a predetermined access point type, computing apparatus 100 places both processor 110 and wireless functionality 120 in a reduced power state in order to conserve power and increase battery life. In this embodiment, computing device 100 may set a timer wake up, which partially wakes wireless functionality 120 to scan for a preferred access point. When wireless functionality 120 detects a preferred access point, wireless functionality 120 stays in a higher power state in order to maintain a network presence with the preferred access point (see FIG. 4 and corresponding text for further details).

In yet another embodiment, computing apparatus 100 uses corporate/user policies to configure processor 110 and/or wireless functionality 120. For example, a user may configure a policy such that after 5:00 PM, computing apparatus 110 places wireless functionality 120 in a reduced power state, regardless of whether computing apparatus 100 is wirelessly connected to a preferred access point (see FIGS. 3, 6, and corresponding text for further details). In this embodiment, computing apparatus 110 may manage multiple policies for configuring processor 110 and wireless functionality 120. For example, an information technology administrator may set a policy for "known" supported access points (corporate hotspots) and the user may set a policy for randomly added access points (e.g., detecting access points during business travel). In yet another embodiment, computing apparatus 110 may instill a "corporate override policy," that, in this embodiment instructs computing device 100 to override the user's policies for critical business calls or emergencies.

Figure 2A:
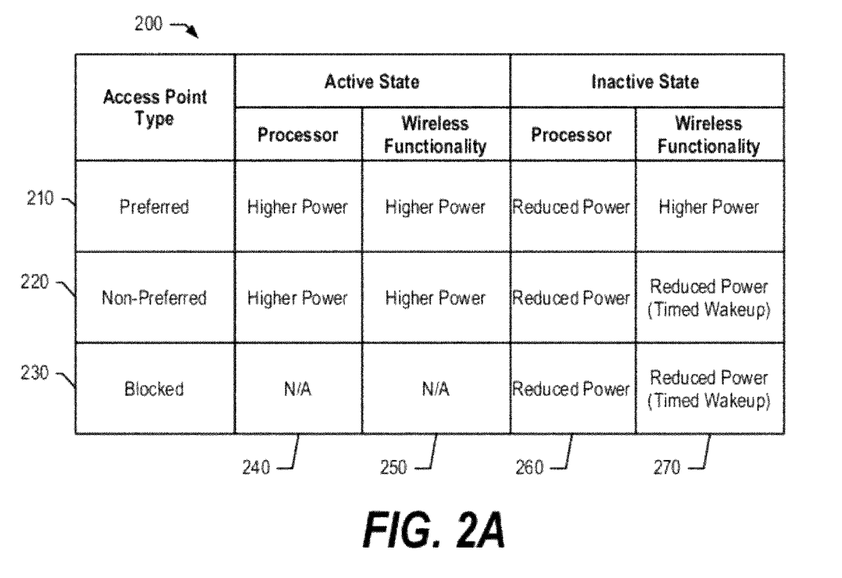
FIG. 2A is a diagram showing various power states of a processor and wireless functionality based upon whether a computing apparatus is connected to a preferred access point or a non-preferred access point.

FIG. 2A is a diagram showing various power states of a processor and wireless functionality based upon whether a computing apparatus is connected to a preferred access point or a non-preferred access point. Table 200 includes rows 210, 220, and 230, which include power state information pertaining to when the computing apparatus is connected to a preferred access point, a non-preferred access point, or a blocked access point, respectively. Columns 240 and 250 include power state information pertaining to when the computing apparatus is in an "active" state and processing network traffic. As can be seen the computing apparatus' processor and wireless functionality are in a higher power state when an access point is a preferred access point (row 210) or a non-preferred access point (row 220). However, when an access point is a blocked access point (row 230), the processor and wireless functionality transition to an inactive state (reduced power) in order to conserve power.

When the computing apparatus transitions to an inactive state (lack of network activity), column 270 shows that the wireless functionality's power state depends upon the type of connected access point. When the access point is a preferred access point, the wireless functionality is in a higher power wireless state (maintains network connection). When the access point is a non-preferred access point, the wireless functionality is in a reduced power wireless state (disconnects from network). In one embodiment, the computing apparatus "wakes-up" the wireless functionality at timed intervals to check for other access points (see FIGS. 4, 5, and corresponding text for further details). As can be seen in column 260, the computing apparatus' processor is in a reduced power processor state in order to conserve power when the computing apparatus is in an inactive state.

Figure 2B:
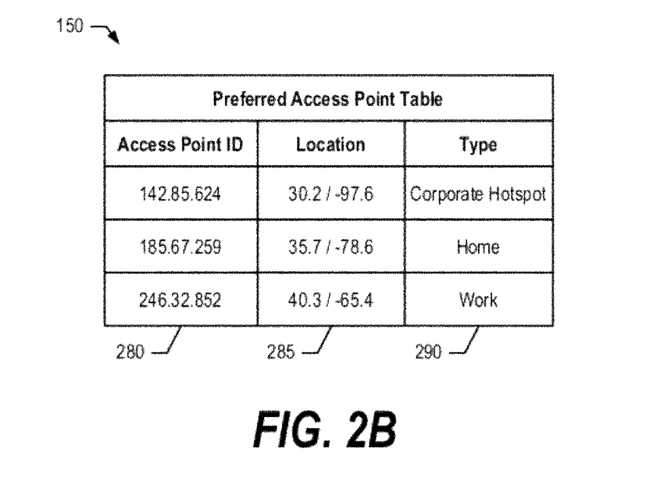
FIG. 2B is a diagram showing a preferred access point table.

FIG. 2B is a diagram showing a preferred access point table. Table 150 is the same as that shown in FIG. 1, and includes a list of predetermined access point types that are preferred access points for computing apparatus 100. Column 280 includes a list of access point identifiers (e.g., IP address, MAC address, etc.) that the computing apparatus utilizes in order to determine whether a detected access point is a preferred access point. Column 285, in one embodiment, includes location attributes of the preferred access points (e.g., latitude and longitude). For example, a computing apparatus may store the location attributes in order to identify proximate preferred access point relative to the computing apparatus' location (see FIG. 5 and corresponding text for further details).

Column 290 includes a list of access point types that, in one embodiment, the computing apparatus utilizes for associating network connection policies. For example, the computing apparatus may turn off the wireless functionality in the evening even though the computing apparatus is connected to a home preferred access point (see FIGS. 3, 6, and corresponding text for further details).

Figure 3:
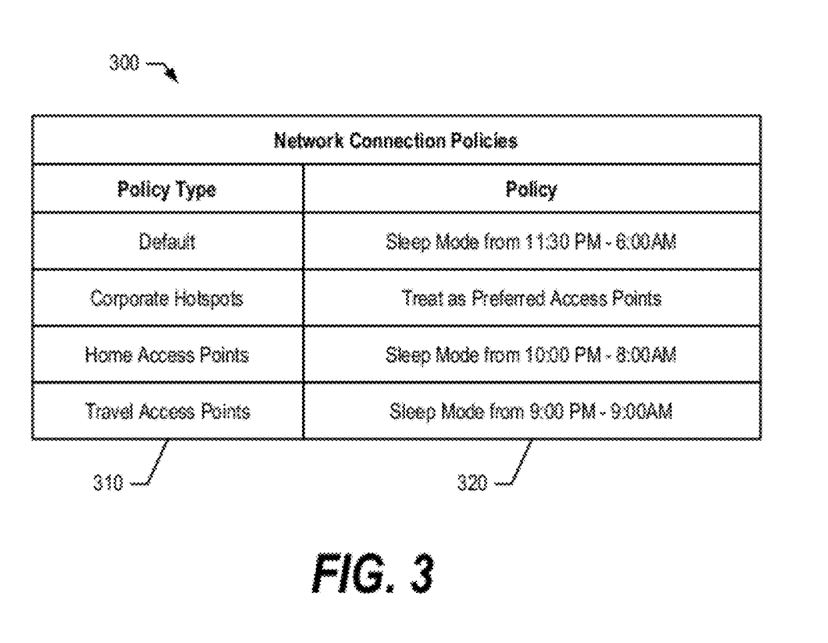
FIG. 3 is diagram showing a network connection policies table.

FIG. 3 is diagram showing a network connection policies table. Table 300 includes a list of policies that informs a computing apparatus when to place a processor and/or wireless functionality in a reduced power state according to the type of identified access point, such as a corporate access point or a home access point.

Table 300 includes columns 310 and 320. Column 310 includes a list of access point policy identifiers and column 320 includes a list of connection policies. In one embodiment, the computing apparatus matches the access point policy identifiers against a detected access point in order to determine a corresponding connection policy. For example, the computing device may receive a list of corporate hotspots (e.g., IP addresses or MAC address) and compare the corporate hotspot list against an access point. In this example, if the access point is a corporate hotspot, the computing apparatus connects to the access point according to a corporate hotspot connection policy included in column 320. As those skilled in the art can appreciate, more or less connection policies may be utilized than what is shown in FIG. 3.

Figure 4:
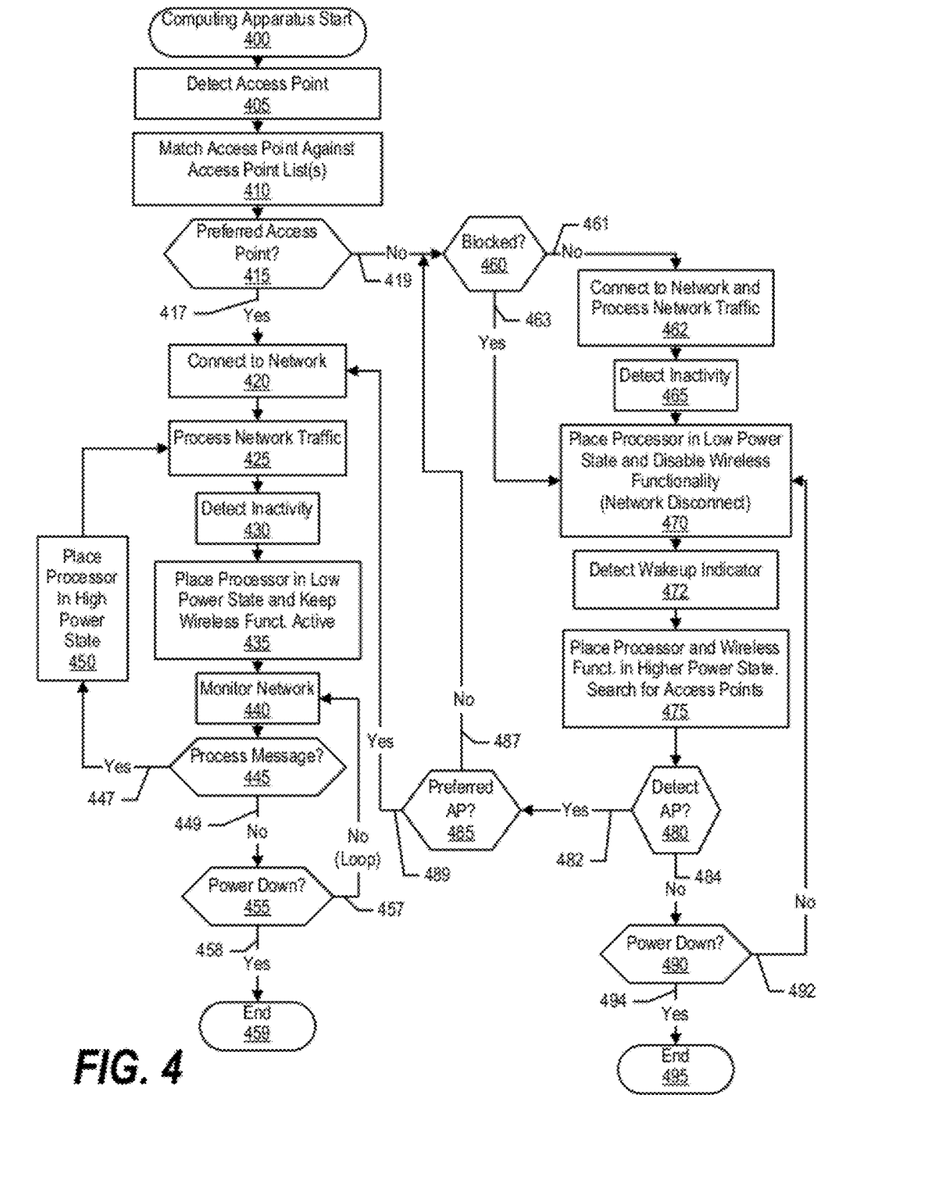
FIG. 4 is a flowchart showing steps taken in maintaining a wireless presence on wireless network when a computing apparatus is wirelessly connected to a preferred access point.

FIG. 4 is a flowchart showing steps taken in maintaining a wireless presence on wireless network when a computing apparatus is wirelessly connected to a predetermined access point type that "preferred." Processing commences at 400, whereupon the computing apparatus detects an access point, such as access point 130 shown in FIG. 1 (step 405). The computing apparatus matches data corresponding to the detected access point against a preferred access point list, such as preferred access point list 150 shown in FIG. 1 (step 410). For example, the computing apparatus may use the access point's identifier (IP address, MAC address, etc.) to look up the detected access point in the preferred access point table.

A determination is made as to whether the detected access point is a preferred access point type (decision 415). For example, the preferred access point list may include a home network access point and multiple business network access points. If the detected access point is a preferred access point, decision 415 branches to "Yes" branch 417, whereupon the computing apparatus establishes a network connection with the detected access point at step 420.

The computing apparatus processes network traffic at step 425 (e.g., email message, Internet traffic, business server requests, etc.) until the computing apparatus detects inactivity at step 430. For example, a user may send/receive email messages for 30 minutes, and then leave for a meeting without turning off the computing apparatus. In turn, in order to conserve power, the computing apparatus places its processor in a lower power processor state and ensures that its wireless functionality is in a higher power state in order to maintain a presence on the established wireless connection (step 435). In one embodiment, the computing apparatus waits for a particular time before performing step 435, such as waiting for the network to become inactive for a period of 10 minutes.

Since the computing apparatus' wireless functionality allows the computing apparatus to maintain a presence on the wireless network, the computing apparatus monitors network traffic at step 440 for messages/packets that are intended for the computing apparatus (decision 445). If the computing apparatus detects a message to process, decision 445 branches to "Yes" branch 447, whereupon the computing apparatus places the processor in a higher power processor state (step 450) and processes network traffic (step 425). On the other hand, if the processor does not detect an intended message, decision 445 branches to "No" branch 449, whereupon a determination is made whether to power down the computing apparatus altogether (decision 455). If the computing apparatus should stayed powered up, decision 455 branches to "No" branch 457, which loops back to monitor network traffic. This looping continues until the computing apparatus should power down, at which point decision 455 branches to "Yes" branch 458 whereupon the computing apparatus ends at 459.

Referring back to decision 415, when the detected access point is not a preferred access point, decision 415 branches to "No" branch 419, whereupon a determination is made as to whether the access point is blocked (not allowed) (decision

460). In one embodiment, a computing apparatus may include a "blocked access points" list that a user/company specifies. In another embodiment, an access point may not allow access (private network), in which case the computing device is blocked from accessing the access point.

If the access point is a blocked access point, decision 460 branches to "Yes" branch 463, whereupon the processor and wireless functionality enter a reduced power state. In one embodiment, the wireless functionality is on a timed wakeup routine (discussed below).

On the other hand, of the access point is not blocked (e.g., non-preferred access point), decision 460 branches to "No" branch 461, whereupon the computing apparatus connects to the wireless network and processes network activity at step 462. At step 465, the computing apparatus detects network inactivity. As discussed above, in one embodiment, the computing apparatus may wait for an inactive timeframe (e.g., 10 minutes) before proceeding to step 470.

Since the computing apparatus at this point is connected to a non-preferred access point, the computing apparatus places both the processor and the wireless functionality in a reduced power processor state and a reduced power wireless state, respectively (step 470). As such, the computing apparatus does not maintain a presence on the wireless network (disconnects).

In one embodiment, at step 472, the computing apparatus detects a wakeup timer. The computing apparatus may configure the wakeup timer to trigger at a specific intervals (e.g., every 30 minutes), or the computing apparatus may compute a wake up based upon the computing apparatus' geographical location and proximate preferred access points (see FIG. 5 and corresponding text for further details).

At step 475, the computing apparatus places the processor and wireless functionality in a higher power state and searches for access points. The computing apparatus determines whether an access point is available at decision 480 and, if so, branches to "Yes" branch 482, whereupon a determination is made as to whether the detected access point is a preferred access point, such as by comparing the detected access point's IP address against preferred access list 150 shown in FIG. 1 (decision 485).

If the detected access point is a preferred access point, decision 485 branches to "Yes" branch 489, whereupon the computing apparatus connects to the preferred access point's wireless network at step 420. On the other hand, if the detected access point is not a preferred access point, decision 485 branches to "No" branch 487, whereupon the computing apparatus determines whether the access point is blocked (decision 460), and performs actions accordingly.

Referring back to decision 480, if the computing apparatus does not detect an access point, decision 480 branches to "No" branch 484, whereupon the computing apparatus determines whether to turn off (decision 490).

If the computing apparatus should stayed powered up, decision 490 branches to "No" branch 492, which loops back to place the processor and wireless functionality in a reduced power state. This looping continues until the computing apparatus should power down, at which point decision 490 branches to "Yes" branch 494 whereupon the computing apparatus ends at 495.

Figure 5:
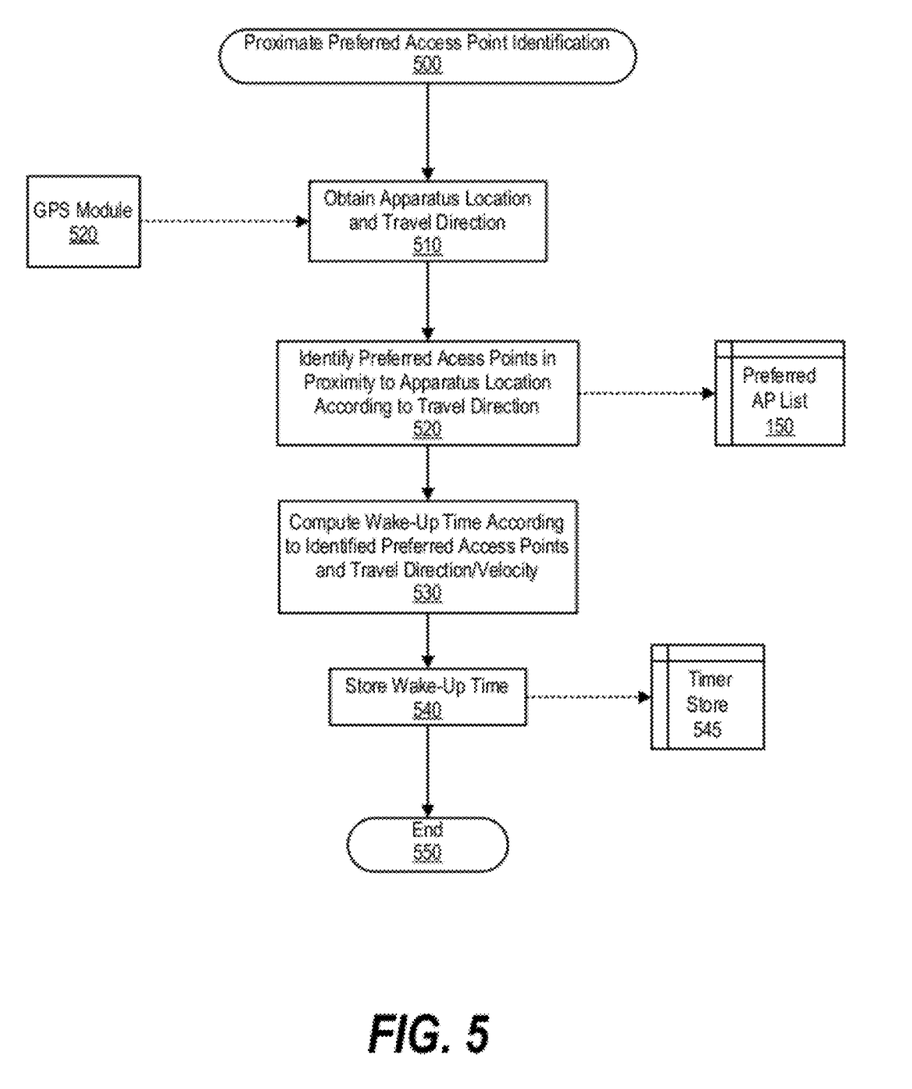
FIG. 5 is a flowchart showing steps taken in computing a wake-up time based upon a computing apparatus' location relative to proximate preferred access points.

FIG. 5 is a flowchart showing steps taken in computing a wake-up time based upon a computing apparatus' location relative to proximate preferred access points. Processing commences at 500, whereupon the computing apparatus uses global positioning system (GPS) module 520 to obtain a current geographical position and, in one embodiment, the computing apparatus' travel direction/velocity (e.g., traveling West at 5 mph) (step 510). Next, the computing apparatus uses the current geographical position to identify proximate access points listed in preferred access point list 150 (step 520).

At step 530, the computing apparatus computes a wake-up time according to the proximate preferred access points and the GPS geographical information. For example, the computing apparatus may be located two miles from a preferred access point and, in this example, GPS direction information indicates that the computing apparatus is traveling towards the preferred access point at 5 mph. In turn, the computing apparatus stores the wakeup time at step 540 in timer store 545, which the computing apparatus subsequently utilizes to wake up and check for available access points (see FIG. 4 and corresponding text for further details). Processing ends at 550.

Figure 6:
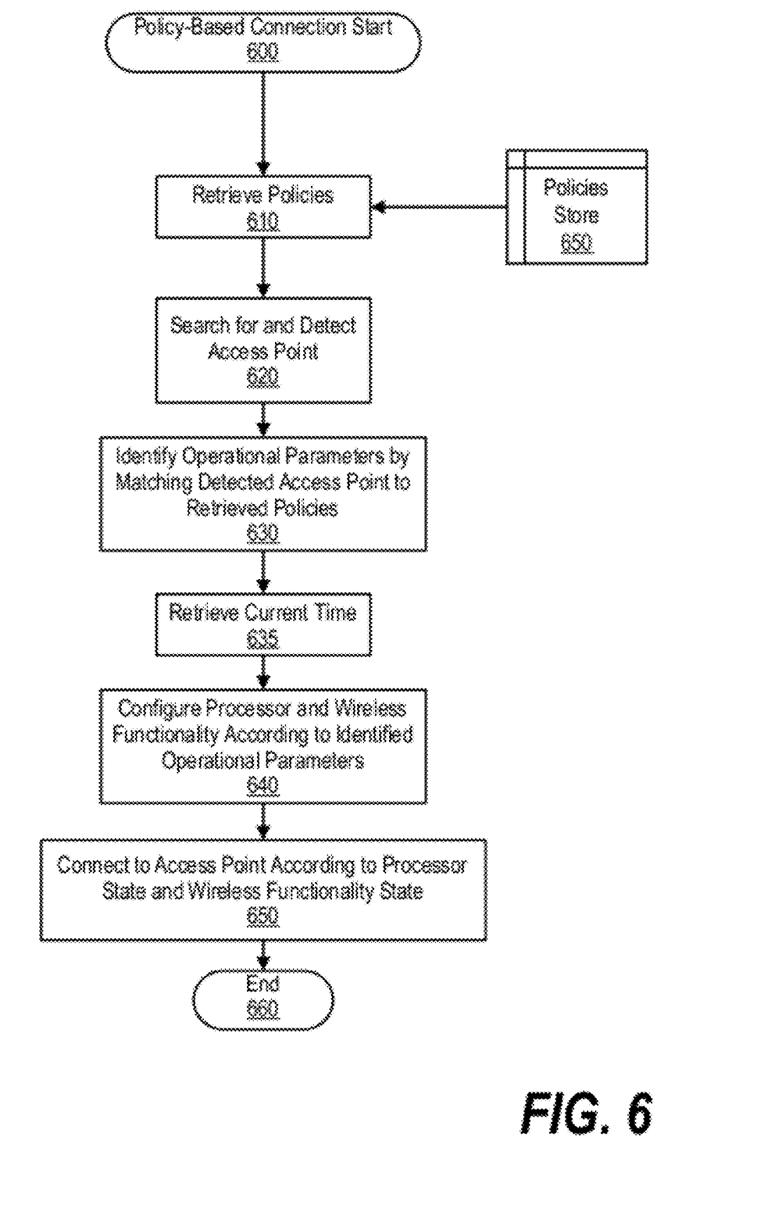
FIG. 6 is a flowchart showing steps taken in a computing apparatus connecting to an access point based upon policies.

FIG. 6 is a flowchart showing steps taken in a computing apparatus connecting to an access point based upon policies. In one embodiment, the policies indicate sleep modes according to the type of access point. For example, when a computing apparatus detects an access point and identifies the access point as a "Travel" access point, the computing apparatus may have a policy to institute sleep mode between the hours of 9:00 PM and 9:00 AM (see FIG. 3 and corresponding text for further details).

Processing commences at 600, whereupon the computing apparatus retrieves policies from policies store 650 (step 610). Policies store 610 may be stored on a volatile or nonvolatile storage area, such as computer memory or a computer hard drive. Next, the computing apparatus searches for access points, and detects an available access point at step 620. The computing apparatus matches the available access point against the retrieved policies and identifies corresponding operational parameters. For example, the computing apparatus may identify the available access point as a "home access point" from the access point's IP address or MAC address. In this example, the computing apparatus identifies a "home access point" policy, which instructs the computing apparatus to place the processor and wireless functionality in reduced power states at particular times of day. In turn, the computing apparatus may retrieve a current time (step 635) (e.g., from internal clock) and configure the processor and wireless functionality (higher power state or reduced power state) according to operational parameters (step 640).

At step 650, the computing apparatus connects to the access point according to the states of the processor and wireless functionality (e.g., higher power processor state/higher power wireless state; reduced power processor state/higher power wireless state; or reduced power processor state/reduced power wireless state), and processing ends at 660.

Figure 7:
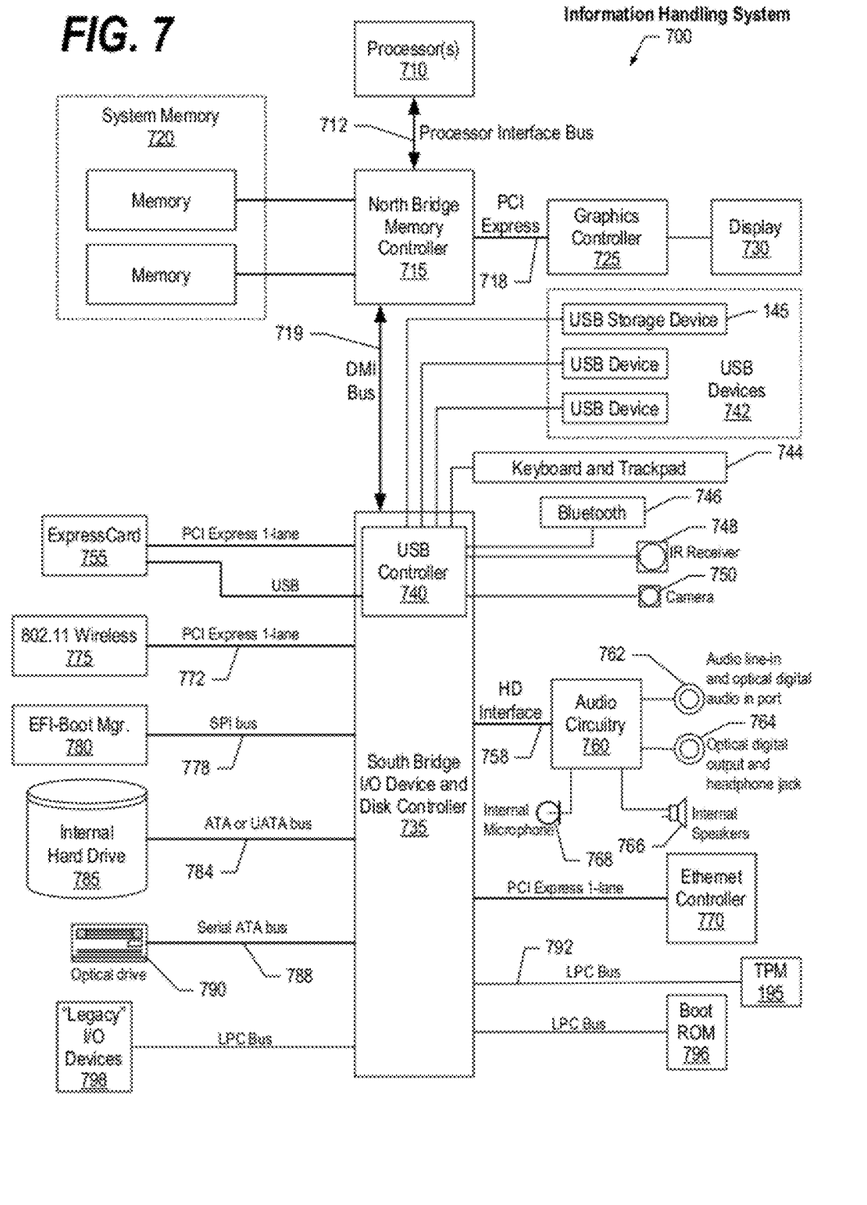
FIG. 7 is a block diagram example of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wirelessly communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
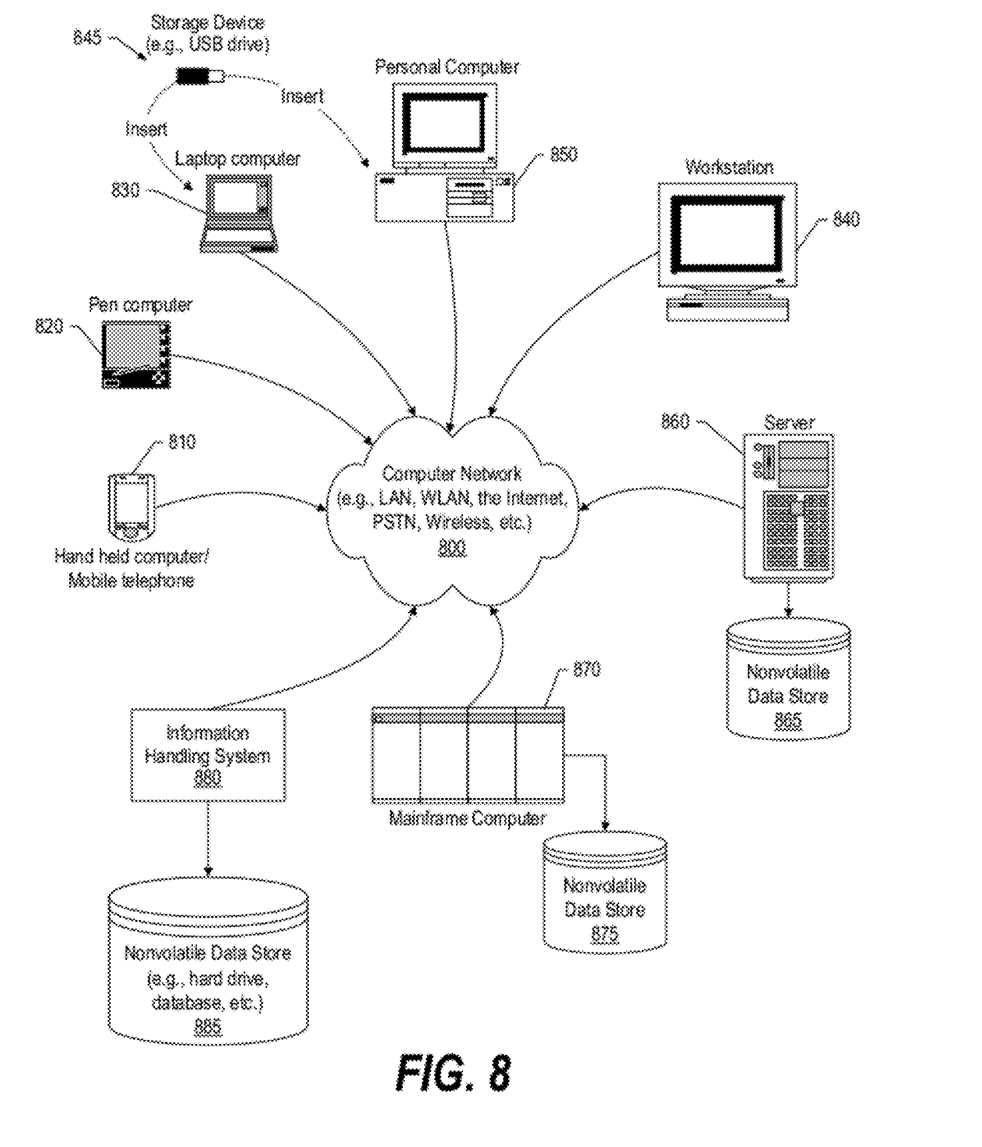
FIG. 8 provides an extension example of the information handling system environment shown in FIG. 7 to illustrate that the methods described herein can be performed on a wide variety of information handling systems which operate in a networked environment.

FIG. 8 provides an extension example of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   receiving data corresponding to a wireless network connection established with an access point;
   determining, based upon the data, whether the access point corresponds to a predetermined access point type;
   determining that a device is to transition to a reduced power state;
   in response to determining that the access point corresponds to the predetermined access point type and determining that the device is to transition to the reduced power state:
   transitioning the device from a first power state to the reduced power state;
   maintaining the wireless network connection by using at least a subset of wireless functionality operatively coupled to the device;
   in response to determining that the access point fails to correspond to the predetermined access point type and determining that the device is to transition to the reduced power state:
   transitioning the device from the first power state to the reduced power state;
   transitioning the wireless functionality to a reduced power wireless state, resulting in disconnecting the wireless network connection;
   detecting a wake up indicator;
   in response to detecting the wake up indicator, transitioning the wireless functionality from the reduced power wireless state to the first power wireless state;
   detecting a subsequent access point in response to the wireless functionality entering the first power wireless state;
   determining that the subsequent access point corresponds to the predetermined access point type;
   establishing a subsequent wireless network connection with the subsequent access point;
   determining that the device is to transition back to the reduced power state;
   in response to determining that the subsequent access point corresponds to the predetermined access point type and determining that the device is to transition back to the reduced power state:
   transitioning the device from the first power state to the reduced power state; and
   maintaining the subsequent wireless network connection by using at least the subset of wireless functionality operatively coupled to the device.

2. The method of claim 1 wherein, prior to detecting the subsequent access point, the method further comprises:
   identifying a current geographical position;
   identifying an access point location corresponding to the subsequent access point; and
   computing a wake up time to invoke the wake up indicator based upon the current geographical position and the access point location.

3. The method of claim 1 further comprising:
   retrieving network connection policies; and
   configuring the wireless functionality according to the retrieved network connection policies.

4. The method of claim 3 further comprising:
   receiving override parameters over the wireless network connection, wherein the override parameters take precedence over the network connection policies; and
   configuring the wireless functionality according to the override parameters.

5. The method of claim 1 further comprising:
   detecting, over the wireless network connection, a message from the access point; and
   in response to detecting the message, transitioning the device from the lower power state to the first power state; and
   utilizing the device in the first power state to process the message.

6. An information handling system comprising:
   one or more processors;
   a memory accessible by at least one of the processors;
   wireless functionality accessible by at least one of the processors;
   a set of instructions stored in the memory and executed by at least one of the processors in order to perform actions of:
   receiving data corresponding to a wireless network connection established with an access point;
   determining, based upon the data, whether the access point corresponds to a predetermined access point type;
   determining that a device is to transition to a reduced power state;
   in response to determining that the access point corresponds to the predetermined access point type and determining that the device is to transition to the reduced power state:
   transitioning the device from a first power state to the reduced power state;
   maintaining the wireless network connection by using at least a subset of wireless functionality operatively coupled to the device;
   in response to determining that the access point fails to correspond to the predetermined access point type and determining that the device is to transition to the reduced power state:

transitioning the device from the first power state to the reduced power state;

transitioning the wireless functionality to a reduced power wireless state, resulting in disconnecting the wireless network connection;

detecting a wake up indicator;

in response to detecting the wake up indicator, transitioning the wireless functionality from the reduced power wireless state to the first power wireless state;

detecting a subsequent access point in response to the wireless functionality entering the first power wireless state;

determining that the subsequent access point corresponds to the predetermined access point type;

establishing a subsequent wireless network connection with the subsequent access point;

determining that the device is to transition back to the reduced power state;

in response to determining that the subsequent access point corresponds to the predetermined access point type and determining that the device is to transition back to the reduced power state:

transitioning the device from the first power state to the reduced power state; and maintaining the subsequent wireless network connection by using at least the subset of wireless functionality operatively coupled to the device.

7. The information handling system of claim 6 wherein, prior to detecting the subsequent access point, the set of instructions stored in the memory and executed by at least one of the processors further performs actions of: identifying a current geographical position;

identifying an access point location corresponding to the subsequent access point; and computing a wake up time to invoke the wake up indicator based upon the current geographical position and the access point location.

8. The information handling system of claim 7 wherein the wake up time is also computed based upon the velocity of the information handling system.

9. The information handling system of claim 6 wherein the set of instructions stored in the memory and executed by at least one of the processors in order to further perform actions of:

retrieving network connection policies;

configuring the wireless functionality according to the retrieved network connection policies;

receiving override parameters over the wireless network connection, wherein the override parameters take precedence over the network connection policies; and configuring the wireless functionality according to the override parameters.

10. The information handling system of claim 6 wherein the set of instructions stored in the memory and executed by at least one of the processors in order to further perform actions of:

detecting, over the wireless network connection, a message from the access point; and in response to detecting the message, transitioning the device from the lower power state to the first power state; and utilizing the device in the first power state to process the message.

11. A computer program product stored in a computer readable storage medium, comprising functional descriptive material that, when executed by an information handling system, causes the information handling system to perform actions that include:

receiving data corresponding to a wireless network connection established with an access point;

determining, based upon the data, whether the access point corresponds to a predetermined access point type;

determining that a device is to transition to a reduced power state;

in response to determining that the access point corresponds to the predetermined access point type and determining that the device is to transition to the reduced power state:

transitioning the device from a first power state to the reduced power state;

maintaining the wireless network connection by using at least a subset of wireless functionality operatively coupled to the device;

in response to determining that the access point fails to correspond to the predetermined access point type and determining that the device is to transition to the reduced power state:

transitioning the device from the first power state to the reduced power state; transitioning the wireless functionality to a reduced power wireless state, resulting in disconnecting the wireless network connection;

detecting a wake up indicator;

in response to detecting the wake UP indicator, transitioning the wireless functionality from the reduced power wireless state to the first power wireless state; detecting a subsequent access point in response to the wireless functionality entering the first power wireless state;

determining that the subsequent access point corresponds to the predetermined access point type;

establishing a subsequent wireless network connection with the subsequent access point;

determining that the device is to transition back to the reduced power state;

in response to determining that the subsequent access point corresponds to the predetermined access point type and determining that the device is to transition back to the reduced power state:

transitioning the device from the first power state to the reduced power state; and maintaining the subsequent wireless network connection by using at least the subset of wireless functionality operatively coupled to the device.

12. The computer program product of claim 11 wherein, prior to detecting the subsequent access point, the information handling system further performs actions that include:

identifying a current geographical position;

identifying an access point location corresponding to the subsequent access point; and computing a wake up time to invoke the wake up indicator based upon the current geographical position and the access point location.

13. The computer program product of claim 11 wherein the information handling system further performs actions that include:

retrieving network connection policies; and configuring the wireless functionality according to the retrieved network connection policies.

14. The computer program product of claim 11 wherein the information handling system further performs actions that include:

detecting, over the wireless network connection, a message from the access point; and in response to detecting the message, transitioning the device from the lower power state to the first power state; and utilizing the device in the first power state to process the message.

15. The computer program product of claim 11 wherein the network connection policies include at least one policy for configuring the wireless functionality based on the time of day and at least one policy for configuring the wireless functionality based on the location of the information handling system.

16. A machine-implemented method comprising:

receiving data corresponding to a wireless network connection established with an access point;

determining, based upon the data, whether the access point corresponds to a predetermined access point type;

determining that a device is to transition to a reduced power state;

in response to determining that the access point corresponds to the predetermined access point type and determining that the device is to transition to the reduced power state:

transitioning the device from a first power state to the reduced power state;

maintaining the wireless network connection by using at least a subset of wireless functionality operatively coupled to the device;

in response to determining that the access point fails to correspond to the predetermined access point type and determining that the device is to transition to the reduced power state:

transitioning the device from the first power state to the reduced power state;

transitioning the wireless functionality to a reduced power wireless state, resulting in disconnecting the wireless network connection;

detecting a wake up indicator;

in response to detecting the wake up indicator, transitioning the wireless functionality from the reduced power wireless state to the first power wireless state;

detecting a subsequent access point in response to the wireless functionality entering the first power wireless state;

determining that the subsequent access point corresponds to the predetermined access point type;

establishing a subsequent wireless network connection with the subsequent access point;

determining that the device is to transition back to the reduced power state;

in response to determining that the subsequent access point corresponds to the predetermined access point type and determining that the device is to transition back to the reduced power state:

transitioning the device from the first power state to the reduced power state; and maintaining the subsequent wireless network connection by using at least the subset of wireless functionality operatively coupled to the device.

17. The method of claim 16, wherein in response to determining successively at least twice while in the reduced power state that data has not been sent to the device while in the reduced power state, powering off the device.

* * * * *